United States Patent [19]

Wilson et al.

[11] Patent Number: 5,146,832
[45] Date of Patent: Sep. 15, 1992

[54] CONNECTOR FOR RIGIDLY CONNECTING PUNCH TIP TO PUNCH PAD

[75] Inventors: Kenneth J. Wilson; John Morehead, both of White Bear Lake

[73] Assignee: Wilson Tool International, Inc., White Bear Lake, Minn.

[21] Appl. No.: 705,189

[22] Filed: May 24, 1991

[51] Int. Cl.⁵ .................................................. B26D 7/26
[52] U.S. Cl. ............................................ 83/698; 83/684; 403/309; 403/314; 403/361
[58] Field of Search .................. 83/698, 55, 405, 481, 83/571, 684, 685, 686, 687; 403/309, 314, 329, 361, 366, 367, 370, 371, 372, 374, 376

[56] References Cited

U.S. PATENT DOCUMENTS

| | | | |
|---|---|---|---|
| Re. 4,228 | 1/1871 | Richards | 83/698 X |
| 78,652 | 6/1868 | Craig | 403/361 X |
| 126,183 | 4/1872 | Charlton | 403/309 |
| 284,704 | 9/1883 | Zschech | 403/314 |
| 691,448 | 1/1902 | Cowell | 403/309 |
| 784,400 | 3/1905 | Howe | 403/278 X |
| 992,352 | 5/1911 | Hänsler | 403/314 |
| 1,012,506 | 12/1911 | Blair | 403/279 |
| 1,091,106 | 3/1914 | Adams | 403/274 X |
| 1,922,770 | 8/1933 | Kornbrath | 72/481 X |
| 2,219,385 | 10/1940 | Ernst | 403/361 X |
| 2,920,913 | 1/1960 | Antila | 83/698 X |
| 3,186,284 | 6/1965 | Bennett | 83/698 X |
| 3,334,406 | 8/1967 | Bennett | 83/698 X |
| 3,402,623 | 9/1968 | Bennett | 83/698 X |
| 4,125,298 | 11/1978 | Heurich et al. | 308/189 R |
| 4,171,656 | 10/1979 | Gargrave | 83/698 |
| 4,526,077 | 7/1985 | DeGuvera | 83/686 |
| 4,620,814 | 11/1986 | May | 403/314 |

Primary Examiner—Frank T. Yost
Assistant Examiner—Raymond D. Woods
Attorney, Agent, or Firm—Fredrikson & Byron

[57] ABSTRACT

A punch has a punch tip with a shank and a punch pad with an orifice for receiving the shank. The punch pad includes a hole positioned closely adjacent the orifice to define a thin wall between the hole and the orifice. The thin wall has a slot which extends through its thickness to define at least one, and preferably two, tabs. An insert, which may be a pin, is provided for insertion into the hole and deforming the tab into supportive, retaining contact with the shank of the punch tip within the orifice. The shank of the punch tip may be provided with a shoulder for abutting the inwardly deformed tab or tabs to restrain withdrawal of the punch tip from the punch pad during operation.

8 Claims, 2 Drawing Sheets

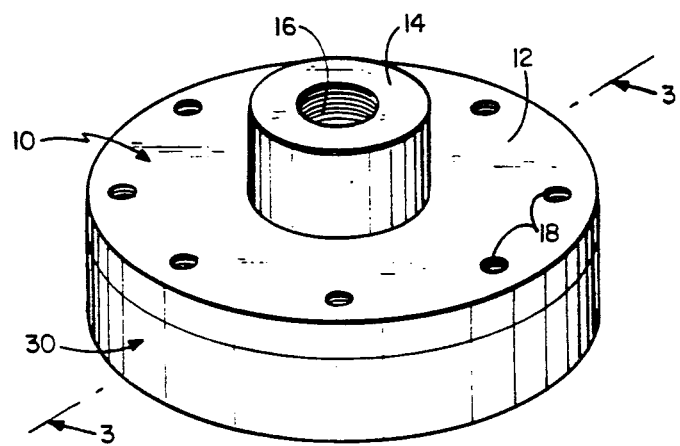
FIG. 1
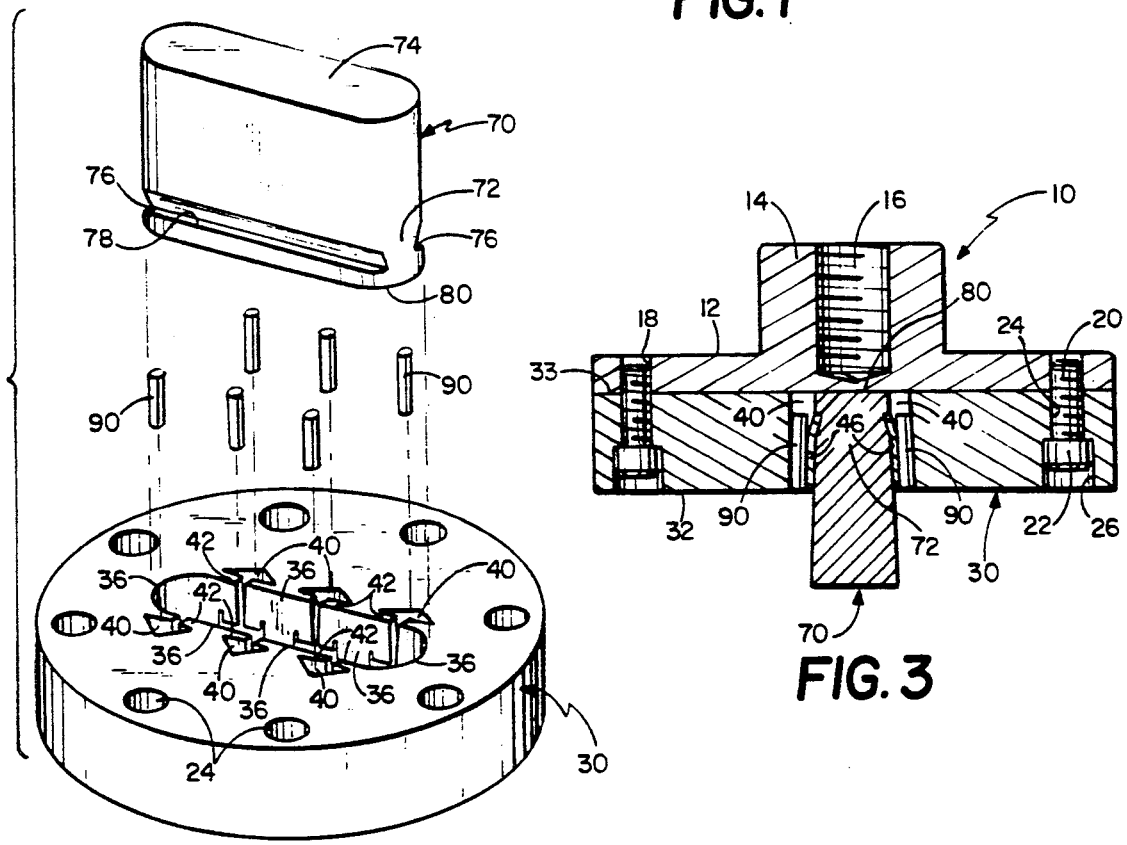
FIG. 2
FIG. 3

CONNECTOR FOR RIGIDLY CONNECTING PUNCH TIP TO PUNCH PAD

BACKGROUND OF THE INVENTION

In the manufacture of punch press equipment, it is desirable to provide the punches and the dies with as much versatility as possible inasmuch as punch press operators are called upon to perform punching operations with a wide variety of shapes and sizes. The punch portion of a punch press may include a punch mount that is attached to the driving mechanism of the punch, a punch pad that is carried by the punch mount, and a punch tip that is mounted to the punch pad and which is receivable within a die of the same shape as the punch tip. During a punching operation in which a sheet of steel, for example, is being punched, the punch tip is driven through the sheet material and into the die, and then is rapidly retracted. As the punch tip is retracted, it tends to carry with it the sheet material; that is, it tends to lift the sheet stock away from the die. Stripper plates, of the type generally shown in U.S. Pat. No. 4,446,767 may be used to prevent the sheet material from following the punch tip as it is retracted (that is, "stripping" the sheet material from the punch tip), but this requires an extremely strong joint between the punch pad and the punch tip to continuously resist the pull that the sheet stock places on the punch tip. The punch tip must be very accurately oriented on the punch pad, of course, so that the punch tip fits exactly into the mating die during a punching operation to avoid equipment breakage or undue wear.

Once the desired punch shape has been determined, it would be desirable to have the capacity to readily manufacture a die, a punch tip, and a punch pad that carries the punch tip in precisely the correct orientation for use in a punching operation.

The inventors experience difficulty in attaching the punch tip to the punch pad in a manner that would both (a) accurately position the punch tip with respect to the punch pad within very narrow tolerances, and (b) fasten the punch tip to the punch pad with sufficient strength so that the punch tip would not come loose or be moved out of position during a punching operation. The inventors found, for example, that the punch tip could be silver soldered to a punch tip holding device such as a punch pad, and although the strength of the fastening operation appeared to be adequate, it was not possible to maintain the needed position accuracy of the punch tip with respect to the punch tip carrier.

BRIEF SUMMARY OF THE INVENTION

It has now been found that a punch tip may be quickly, accurately and very strongly secured to a punch pad using a unique fastening technique. According to this technique, a punch tip having a shank can be accurately and rigidly secured to a punch pad having an orifice by forming a hole in the punch pad closely adjacent the periphery of the orifice to define between the hole and orifice a thin wall. A slot is then formed in the wall extending through its thickness to provide tabs deformable inwardly of the orifice. The shank of the punch tip may then be positioned within the orifice and the tabs may be deformed inwardly of the orifice to contact and securely hold the shank of the punch tip within the orifice.

In a particularly preferred embodiment, a plurality of said holes and associated slots are formed about the periphery of the orifice and each hole includes a convergently tapered interior portion configured to receive an insert sized to bear outwardly against the tabs when inserted into the hole. Lateral slots may be provided in each tab at a position spaced away from the central slot to form an inwardly deformable flange adjacent one end of each tab. If so desired, the shank of the punch tip may be provided with a recess for receiving a portion of the tabs when they are inwardly deformed, the tabs engaging a shoulder on the recess to prevent withdrawal of the shank from the orifice in one direction.

BRIEF DESCRIPTION OF THE DRAWINGS

FIG. 1 is a top perspective view of a punch pad and punch mount of the invention;

FIG. 2 is an exploded bottom perspective view of a punch of the invention;

FIG. 3 is a cross sectional view of an assembled punch according to the invention;

DETAILED DESCRIPTION OF THE PREFERRED EMBODIMENTS

Figure 4A:
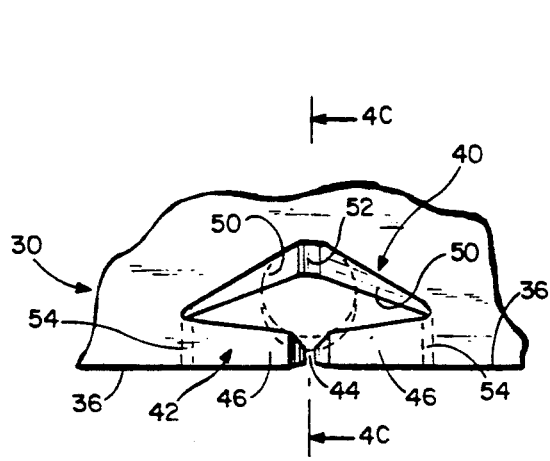
FIG. 4A is a top view of an insert receiving hole of the invention.
Figure 5:
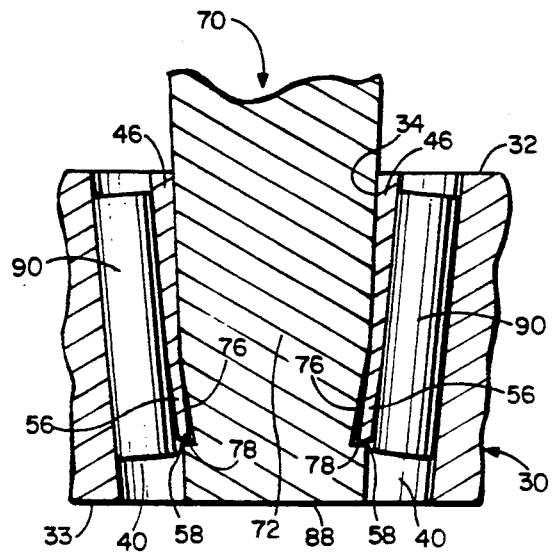
FIG. 5 is a close up, cross sectional view of the connection between a punch tip and punch pad according to the present invention.

The punch of the invention is shown in FIGS. 1-5. The invention generally includes a punch tip 70 which is secured to a punch pad 30, and the punch pad may in turn be affixed to a punch mount 10. Punch mounts such as the one shown are commonly employed to permit a variety of different shapes to be punched out of any given stock by removably mounting a punch and a die (not shown) to a punch press (also not shown). When one has punched a sufficient number of pieces of a given shape from a sheet stock, one may simply remove the punch and die utilized to form those pieces and replace them with a different punch and die configured to produce articles having a different size or shape. The punch mount 10 may include a mounting plate 12 and a mounting means 14, which is preferably centered on the mounting plate 12. Any suitable connecting means may be used. In the embodiment depicted, the connecting means comprises an upright cylinder having a threaded aperture 16 formed in the center thereof. The aperture 16 is desirably configured to receive and engage a mating portion on the punch press (not shown) to connect the punch to the punch press.

The mounting plate 12 ma be affixed to the punch plate 30 in any known manner. In the preferred embodiment shown, bolts 20 are received within aligned bolt receiving holes in the punch mount and the punch pad (18 and 24, respectively). The bolt 20 is desirably retained entirely within the punch pad 30 and punch mount 10, i.e., does not extend rearwardly through the mounting plate or forwardly beyond the forward face 32 of the punch pad. If so desired, a head-receiving recess 26 may be provided in either the punch pad or the punch mount to receive the head 22 of the bolt so the bolt does not protrude out of the punch pad or punch mount. A plurality of bolts may be employed, and the bolts are desirably spaced about the periphery of the punch pad.

The mounting plate 12 desirably has the same outer dimension as the punch pad 30, as shown. The punch pad may be of any desired shape or size, but is most commonly substantially circular in cross section. This produces a punch pad 30 having a short, generally cylindrical shape and a mounting plate 12 which takes the form of a generally circular disk.

A punch pad 30 of the invention includes an orifice 34 for receiving the shank 72 of the punch tip 70. The shape of the punch tip will vary depending upon the shape of the piece to be punched out of the sheet stock. The forward face 74 of the punch tip should be sized to be closely received within a mating orifice provided in the die, the forward face 74 of the punch tip and the orifice of the die being sized to accurately punch a piece of the desired size and shape from a sheet stock. Although the shank 72 of the punch tip 70 could be significantly different in size and shape from the size and shape of the face 74 of the punch tip, it is preferred that the dimensions of the shank be close to those of the face 74. In a particularly preferred embodiment of the present invention, the punch tip 70 tapers slightly inwardly in a direction away from the face 74 such that the outer dimensions of the shank are slightly less than the face of the punch tip. For reasons explained in more detail below, the shank of the punch tip may include one or more recesses 76. Each recess desirably includes a forward facing shoulder 78 for engaging the punch pad 30.

As noted above, the punch pad includes an orifice 34 for closely receiving the shank 72 of the punch tip. The inner dimensions of this orifice are desirably only slightly greater than the outer dimension of the shank to permit the shank to be accurately positioned within the orifice without requiring undue force to drive the shank into the orifice.

The orifice desirably extends substantially through the entire thickness of the punch pad 30. The length of the shank retained within this orifice should be sufficient to ensure both accurate orientation of the punch tip with respect to the punch pad and that the punch pad will retain the punch tip when the punch is in use. In a preferred embodiment, the punch is positioned within the orifice such that the rearward face 80 of the punch tip is substantially flush with the rearward face 33 of the punch pad. This may be accomplished by placing the punch pad against a firm support (not shown) and driving the shank of the punch tip into the orifice 34 until the rearward face of the punch tip engages the level support. In a preferred embodiment, though, the shank is tapered, as noted above, and the inner dimensions of the orifice are less than the outer dimensions of the forward face 74 of the punch tip. By appropriately choosing the degree of taper on the shank, which may be between about 0° and about 12°, and the maximum dimensions of the orifice, one may accurately axially position the shank within the orifice because the shank may be driven into the orifice with relatively little force until the outer dimensions of the shank are substantially equal to the inner dimensions of the orifice.

Figure 4B:
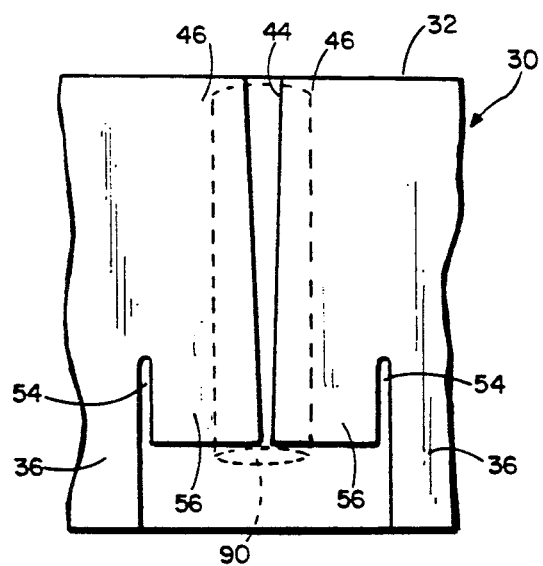
FIG. 4B is a front view of the hole of FIG. 4A.
Figure 4C:
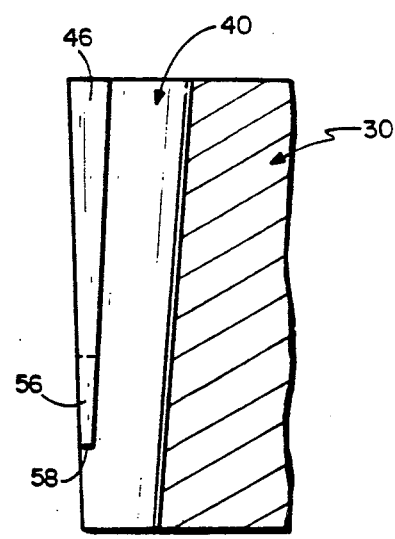
FIG. 4C is a cross sectional view of the hole of FIG. 4A taken along section line 4C.

The punch pad 30 also includes at least one hole 40 positioned closely adjacent the orifice 34 to define a thin wall 42 between the hole and the orifice. As best seen in FIGS. 4A–C, the thin wall 42 includes a slot 44 extending through its thickness to provide at least one deformable tab 46. Although the slot may be positioned as desired, it is desirably substantially centered along the thin wall 42 to provide a pair of symmetrical tabs 46, with one tab being disposed on either side of the slot. For reasons explained in more detail below, in a preferred embodiment the slot 44 is tapered to become more narrow in a direction away from the forward face 32 of the punch pad 30.

In a particularly preferred embodiment, best seen in FIGS. 4A and 4C, the hole 40 has an inwardly convergent interior which is angled inwardly of the orifice 34 in a direction away from the forward face 32 of the punch pad. Although the hole may be of any suitable shape, in a particularly preferred embodiment it is generally triangular in cross section with the thin wall 42 extending generally parallel to the adjacent periphery of the orifice 34. The other two legs of this triangular cross section are defined by opposite interior walls 50. These walls 50 may be angled inwardly in a direction away from the forward face 32 of the punch pad to provide the hole 40 with the inwardly converging interior noted above. In order to assist in accurately placing a cylindrical insert 90, described in detail below, the apex of these two walls may be provided with a flat face 52 rather than coming to a more sharply angled apex. In the embodiment shown, the thin wall 42 may be tapered in a direction away from the upper face 32 of the punch pad so that it may be deformed more readily toward its rearward end than toward its forward end adjacent the forward face 32. As best seen in FIG. 4B, each hole may be provided with a pair of lateral slots 54, with one such lateral slot being associated with each tab 46 of the thin wall 42. Each such lateral slot 54 is desirably spaced away from the first slot 44 positioned centrally along the thin wall. The lateral slots 54 desirably extend forwardly from the rearward face 33 of the punch pad to define a rearward flange 56 adjacent the rearward end of each tab. For reasons explained in more detail below, the tabs, including their rearward flanges, do not extend through the entire thickness of the punch pad 30, but rather terminate at a location spaced forwardly of the rearward face 33 of the punch pad.

The hole 40 of the invention is adapted to receive an insert 90 therein. This insert may be of any desired shape. For instance, it may be generally wedge-shaped and be inserted into the hole, narrow end first. In a preferred embodiment, though, the insert 90 is generally cylindrical in shape, as shown. The insert is desirably slightly larger than the maximum inner dimension of the hole 40. In this manner, as the insert 90 is driven into position within the hole 40, it will urge inwardly against the thin wall 42. Although the punch tip 70 is desirably formed of a high strength material, such as a high carbon steel, the punch pad 30 is preferably formed of a material, such as shock steel, which is more readily plastically deformed. Hence, as the insert is driven into the hole and urges inwardly against the wall 42, it will tend to deform the tabs inwardly of the orifice. In a method of assembling a punch of the invention dealt with more extensively below, the shank 72 of the punch 70 is first positioned within the orifice 34 of the punch pad. Once the shank is properly positioned, the insert 90 is driven into the hole. This will therefore deform the tabs 46 inwardly of the orifice into supportive, retaining contact with the shank. As noted above, the shank 72 may be tapered away from its forward face 74. By making the slot 44 through the thin wall 42 tapered, as also described above, the gap in the thin wall defined by the slot is greatest adjacent the forward face 32 of the punch pad. This permits the insert 90 to be received more readily, i.e., by requiring less deformation of the tabs 46, adjacent the forward end of the hole than toward its rearward end. Hence, the tabs will be deformed inwardly to a greater extent toward their rearward end, permitting them to continue to closely engage the shank 72 as it narrows in the same direction.

Forming the lateral slots 54 defines a flange 56 on each tab which is connected to the rest of the punch pad only through the tab 46. This permits the flanges to be deformed inwardly of the hole more readily than the rest of the tab. This permits the flanges to be deformed into the recesses 76 provided in the shank of the punch tip. As noted above, the flanges desirably terminate at a position spaced forwardly of the rearward face 33 of the punch pad. This permits the flanges to be entirely received within the recess in the shank such that the rearward ends 58 of the flanges may abut the forwardly facing shoulder 78 of the recess to prevent withdrawal of the shank in response to the pull that the sheet stock places on the punch tip as it is retracted therefrom.

In a particularly preferred embodiment, a plurality of such holes 40 are provided about the periphery of the orifice 34. The holes are desirably spaced about the periphery of the orifice a sufficient distance apart from one another to provide between the deformable walls of adjacent holes non-deformable wall portions 36 of the orifice. These non-deformable wall portions serve to engage the shank of the punch tip as it is inserted into the orifice to accurately position and orient the shank with respect to the punch pad. If so desired, the holes 40 may be positioned about the orifice to define opposed pairs of holes, with each hole of such a pair being positioned opposite the other hole of the pair about the periphery. This permits the tabs of these paired holes to engage opposite sides of the tapered shank. This tends to pin the tapered shank in between the opposed tabs, counteracting any lateral movement which may occur within the orifice as the inserts are driven into their respective holes. A plurality of recesses 76 may be provided to receive the flanges 56 presented by the plurality of holes. Alternatively, a single, elongate recess may be provided extending about the exterior of the shank at a position along the shank's length to receive all of the flanges.

The present invention also contemplates a method for accurately and rigidly securing a punch tip having a shank to a punch pad having a shank-receiving orifice. In carrying out this method, at least one hole is formed in the punch pad at a location closely adjacent the orifice to define between the hole and orifice a thin wall. A slot may then be formed in the wall and desirably extends through the wall's thickness to provide tabs which are deformable inwardly of the orifice. Formation of the hole and the slot may be carried out by any suitable machining technique. In a preferred embodiment, electron discharge machining (EDM) is utilized. This technique is well known in the art and need not be discussed at great length here. One of the major advantages of the EDM technique is that one may readily form very accurately machined articles from a wide range of electrically conductive materials, including most metals.

In forming the slot 44 through the thin wall 42, it is preferable that the slot is formed such that it tapers in a direction away from the forward face 32 of the punch pad, as noted above. The hole 40 should be configured to receive an insert sized to bear outwardly against the tabs when inserted into the hole. As noted above, the hole is desirably formed in a shape having a generally triangular cross section, and may have a convergently tapered interior portion oriented to converge inwardly in a direction away from the forward face 32 of the punch pad. In this embodiment, the thin wall 42 defines one leg of the triangular hole and extends generally parallel to the adjacent periphery of the orifice. Although the wall may be truly parallel to the periphery of the orifice, in the preferred embodiment best seen in Figure 4C, the thin wall desirably tapers in a direction away from the forward face of the punch pad 32.

One may also form one or more lateral slots 54 through the thin wall 42. These lateral slots desirably extend generally upwardly from the rearward face 33 of the punch pad with one lateral slot being disposed on either side of the first slot 44 to define an inwardly deformable rearward flange 56 on each tab. The hole 40 formed in the steps outlined above may extend to the entire thickness of the punch pad, but the rearwardly flanges 56 of the tabs are desirably cut off at a location spaced forwardly from the rearward face 33 of the punch pad, thereby defining a rearward edge 58 on each flange. If so desired, a plurality of such holes and slots are formed in spaced relationship to one another about the periphery of the orifice 34. Each hole and slot so formed are desirably configured to provide at least one tab 46 associated with the hole, the tabs being inwardly deformable of the orifice. In a particularly preferred embodiment, the holes are spaced about the periphery of the orifice a sufficient distance to provide between the thin, deformable walls 42, non-deformable wall portions 36 of the orifice. In a preferred embodiment, the portion of the interior walls of the orifice 34 made up by the non-deformable wall portions is at least as great as the surface area of the inner wall of the orifice 34 defined by the thin, deformable walls 42 associated with the holes 40.

Once the holes and slots have been formed in the punch pad 30, the shank 72 of the punch tip 70 may be positioned within the orifice. In the preferred embodiment shown in the drawings, though, the shank 72 includes one or more recesses 76. These recesses are desirably formed in the shank of the punch tip before the punch tip is positioned within the orifice. These recesses may also be formed by the EDM technique utilized to form the holes and slots in the punch pad. Each recess 76 desirably is formed with a generally forwardly-facing shoulder 78, which may be formed at the rearward end of the recess 76. Once the recess or recesses 76 have been formed along the exterior of the shank 72 of the punch, the shank may be positioned within the orifice. The recesses are desirably formed on the shank at a location wherein they may receive a portion of a tab 46 when the tab is inwardly deformed. As noted above, the shank is desirably axially positioned within the orifice at a location wherein the rearward face 80 of the punch tip is adjacent the rearward face 33 of the punch pad. This permits the maximum surface area of the shank to be disposed within the orifice without having the shank protrude rearwardly past the rearward face 33 of the punch pad. As also explained above, the shank 72 may be tapered in a direction away from the forward face 74 of the punch tip. This taper may be formed at the same time as the recesses 76 are formed in the shank. The point along the length of the shank wherein the outer dimensions of the shank equal the inner dimensions of the orifice serves as an abutment to limit further insertion of the shank into the orifice. Thus, the taper of the shank may be chosen such that when the shank is inserted into the orifice until its dimensions substantially equal the dimensions of the orifice, the recesses 76 and rearward face 88 of the shank will be positioned as desired.

Once the shank 72 is positioned within the orifice 34, the inserts 90 may be driven into the holes 40. As explained above, this will tend to deform the tabs 46 inwardly of the orifice to contact and securely hold the shank 72. It should be understood that it may not be necessary to drive an insert into each of the holes in order to have an adequately secure connection between the punch pad and the punch tip; even if a plurality of holes are formed about the periphery of the orifice, it may be sufficient to drive only one insert into one hole.

The inserts 90 are desirably sized to bear outwardly against the tabs 46 and to be long enough to permit them to deform the entire lengths of the tabs. As noted above, providing the slot 44 with a rearward taper increases the urging force of the insert against the tabs in a rearward direction. By forming the tabs 46 such that they also taper in a rearward direction, they will yield more readily to the urging force of the insert adjacent their rearward end where they are thinner. This ensures that if a tapered shank is used, the tabs will be deformed inwardly to a greater extent in a rearward direction so that they may tightly engage the exterior of the shank along the entire length of the tab.

If a rearward flange 56 is employed, this tab will tend to be more readily deformable than the rest of the tab due to the fact that it is separated from the rest of the wall of the orifice by the lateral slots 54. These flanges are desirably positioned immediately adjacent a recess 76 in the shank so that when the insert is driven down into the hole and bears outwardly against the flanges, the flanges will be urged inwardly into the recess 76 and the rearward edge 58 of the flange may engage the generally forwardly facing shoulder 78 on the shank to prevent withdrawal of the shank from the orifice in the forward direction. As the increase in the outer diameter of the shank forwardly of the forward face 32 of the punch pad will limit rearward movement of the punch tip with respect to the punch pad, and the inwardly deformed tabs limit lateral movement, the shank 72 is securely positioned within this orifice and will resist substantially all movement with respect to the punch pad when the punch is used in combination with a die to punch out pieces of a desired shape from a sheet stock.

While a preferred embodiment of the present invention has been described, it should be understood that various changes, adaptations and modifications may be made therein without departing from the spirit of the invention and the scope of the appended claims.

We claim:

1. A punch comprising a punch tip having an elongated shank, a punch pad having an orifice sized to closely receive the shank and including a hole positioned closely adjacent to the orifice to define a thin wall between the hole and the orifice, the thin wall including a slot extending through its thickness to provide a pair of deformable tabs, and an insert receivable in the hole for deforming the tabs into supportive, retaining contact with the shank when the shank is received within the orifice.

2. The punch of claim 1 wherein the punch pad is provided with a plurality of said holes spaced about the periphery of the orifice.

3. The punch of claim 1 wherein the hole includes a convergently tapered interior configured to receive the insert, the insert being sized to bear outwardly against the deformable tabs as the insert is received in the hole to deform said tabs inwardly of the orifice.

4. The punch of claim 1 wherein said shank of the punch tip includes a recess sized to receive a portion of the deformable tabs and positioned to restrain withdrawal of the punch tip from the punch pad.

5. The punch of claim 4 wherein said recess includes a shoulder for abutting the tabs to restrict movement of the shank within the orifice.

6. The punch of claim 1 further comprising a pair of lateral slots spaced laterally away from said slot, one lateral slot being associated with each tab to define an inwardly deformable flange on each tab.

7. The punch of claim 7 wherein said shank of the punch tip includes a recess positioned to and sized to receive the flanges of the tabs.

8. A punch comprising a punch tip having an elongated shank, a punch pad having an orifice sized to closely receive the shank and including a hole positioned closely adjacent to the orifice to define a thin wall between the hole and the orifice; the hole being generally triangular in cross section; the thin wall including a slot extending through its thickness to provide a deformable tab; and insert means receivable in the hole for deforming the tab into supportive, retaining contact with the shank when the shank is received within the orifice.

* * * * *